United States Patent Office 3,814,734
Patented June 4, 1974

3,814,734
MULTICOMPONENT INTERPOLYMERS HAVING ALTERNATING SEQUENTIAL STRUCTURE
Shohachi Kawasumi, Takatsuki, and Masaaki Hirooka and Hiroshi Yabuuchi, Ibaraki, Japan, assignors to Sumitomo Chemical Company, Limited, Osaka, Japan
No Drawing. Continuation-in-part of application Ser. No. 170,365, Aug. 9, 1971, which is a continuation of application Ser. No. 7,214, Jan. 30, 1970, which in turn is a continuation-in-part of application Ser. No. 642,702, June 1, 1967, all now abandoned. This application Oct. 18, 1972, Ser. No. 298,780
Claims priority, application Japan, June 6, 1966, 41/36,745
Int. Cl. C08f 9/00, 15/40, 25/00
U.S. Cl. 260—63 R    28 Claims

ABSTRACT OF THE DISCLOSURE

A conjugated vinyl compound having a nitrile or carbonyl group in the conjugated position [(B) group monomer] forms a complex with at least one organoaluminum halide or at least one organoboron halide, and this complex reacts with an olefinic monomer [(A) group monomer] to produce an alternating copolymer. The present invention is based on the discovery that when there are a plurality of the (A) group monomers and/or a plurality of the (B) group monomers in said alternating copolymerization system, a multicomponent interpolymer can also be obtained in which the interpolymer essentially has a structure in which monomer units from the (A) group always alternate with monomer units from the (B) group, each monomer unit from the (A) group being linked only to monomer units from the (B) group and each monomer unit from the (B) group being linked only to monomer units from the (A) group. Further the present invention concerns the application of said multicomponent interpolymers and a method for the production thereof.

CROSS-REFERENCES TO RELATED APPLICATIONS

This is a continuation-in-part application of application Ser. No. 170,365; filed Aug. 9, 1971, now abandoned, which is a streamlined continuation of application Ser. No. 7,214, filed Jan. 30, 1970, now abandoned, which is a continuation-in-part application of application Ser. No. 642,702, filed June 1, 1967, now abandoned.

The present invention relates to an interpolymer consisting of three to ten monomers and a method for producing the same. More particularly, it relates to an interpolymer having a structure in which monomer units from group (A) alternate with monomer units from group (B) produced by polymerizing three to ten monomers selected from groups (A) and (B), said monomers including at least one monomer selected from group (A) and at least one monomer selected from group (B).

The present inventors already found that a conjugated vinyl compound having a nitrile or carbonyl group in a conjugated position with regard to the carbon-carbon double bond forms a complex with an organoaluminum halide or organoboron halide, and this complex reacts with an olefinic compound to give an alternating copolymer, and have invented many alternating copolymers based on this finding. As said conjugated vinyl compounds, there may be used acrylonitrile, acrylic acid, salts thereof, acrylic esters, acrylamides, acryloyl halides, acrolein, vinyl ketones and the like. Further, α- and β-substituted compounds thereof may also be used. These compounds are referred to hereinafter as group (B) monomers. On the other hand, as said olefinic compounds, there may be used olefinic hydrocarbons, olefinic halohydrocarbons, polyenes, acetylenes, unsaturated esters of carboxylic acids and N-, O- or S-containing unsaturated non-conjugated compounds. These compounds are referred to hereinafter as group (A) monomers. Only when a monomer selected from the (A) group is combined with a monomer selected from group (B), can an alternating copolymer be obtained by such a complexed copolymerization. Furthermore, the presence of the above-mentioned aluminum or boron compounds is required. Under such special conditions, the polymer so produced consists essentially of a structure in which units from the group (A) monomers are always linked only to units from the group (B) monomers and the units from the group (B) monomers are always linked only to units from the group (A) monomers, whereby a so-called alternating copolymer is obtained. This technique is disclosed by the present inventors in Pats. Nos. 3,326,870; 3,647,771; 3,635,924; 3,578,636; 3,647,753; 3,629,215 and 3,671,492 and applications Ser. Nos. 3,559, abandoned in favor of continuation-in-part application Ser. No. 320,909, filed Jan. 4, 1973, and 115,874, now Pat. No. 3,700,647 and it is proved that alternating copolymers are obtained from combinations of these monomers.

However, it has been quite unknown how the reaction would proceed when three or more monomers from groups (A) and (B) are subjected together to such copolymerization reaction. According to a conventional copolymerization technique, in general, random copolymers are obtained, and hence, it can easily be predicted that when three or more monomers are used, random copolymers are also obtained. In the complexed copolymerization found by the present inventors, however, monomer units from group (A) regularly alternate with monomer units from group (B). Therefore, it is impossible to infer what type of interpolymer is produced when another monomer (C) is subjected together with the group (A) monomer and the group (B) monomer to the complexed copolymerization, because there are very many possibilities. For instance, the following cases are inferable:

(i) The (A) monomer, the (B) monomer and the (C) monomer are regularly alternately arranged to form such a polymer as —ABCABCABCABC—.
(ii) The (C) monomer affects the alternate bond between monomers (A) and (B) to form a random terpolymer.
(iii) When the (C) monomer belongs to either group (A) or (B), the case is further generalized to premise $n$ (A) monomers as $(A_1)$, $(A_2)$, . . . $(A_n)$ and $m$ (B) monomers as $(B_1)$, $(B_2)$, . . . $(B_m)$. In this case, regardless of the number of $n$ or $m$, monomers belonging to group (A) are linked only to monomers belonging to group (B), and monomers belonging to group (B) are also linked only to monomers belonging to group (A) to form such a polymer as $$-A_1B_2A_3B_1A_nB_5A_{n-3}B_m-$$

(iv) A mixture of an A–B alternating copolymer with a homopolymer of monomer (C) is obtained.
(v) A mixture of an A–C alternating copolymer or a B–C alternating copolymer with a homopolymer of monomer (A) or (B) is obtained.
(vi) A mixture of an A–B alternating copolymer with an A–C or B–C alternating copolymer is obtained.
(vii) Monomers (A) and (B) are linked to form a (A–B) monomer, which is further reacted with monomer (C) at random to form a terpolymer.

Therefore, it is impossible to predict which reaction is caused.

The present inventors have found that an alternating multicomponent interpolymer can be produced as in case (iii) and have accomplished the present invention based on this finding. That is, when a plurality of the (A) monomers and/or a plurality of the (B) monomers (for a three-component polymer when a plurality of the (A) monomers are used, only one (B) monomer may also be used, and when a plurality of the (B) monomers are used, only one (A) monomer may also be used) are subjected to complexed copolymerization, the polymer so produced consists essentially of a structure in which units from monomers belonging to group (A) are always linked only to units from monomers belonging to group (B) and units from monomers belonging to group (B) are always linked only to units from monomers belonging to group (A). Therefore, in the copolymer produced, the amount of monomer units from group (A) is about 50 mole percent and that of monomer units from group (B) is also about 50 mole percent. That is, the number of the total monomer units from one group is substantially equal to that from the other group in the produced copolymer.

An object of the present invention is to provide a multi-component interpolymer having a novel, regular sequential structure as mentioned above.

Another object of the present invention is to provide a method suitable for producing such a novel alternating interpolymer.

Other objects and advantages of the present invention will become clear from the following description.

The interpolymer of the present invention is an alternating interpolymer of three to ten monomers selected from the (A) and (B) monomer groups, wherein at least one monomer is selected from group (A) and at least one monomer is selected from group (B), said group (A) consisting of:

(1) terminally ethylenically unsaturated compounds having the formula:

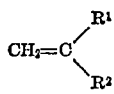

wherein $R^1$ and $R^2$ each is a hydrogen atom, a halogen atom, a hydrocarbon or halohydrocarbon radical having 1 to 20 carbon atoms, (2) internal olefinic compounds having the formula:

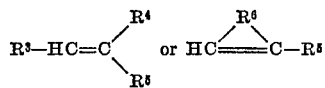

wherein $R^3$ and $R^4$ each is a hydrocarbon or halohydrocarbon radical having 1 to 20 carbon atoms, $R^5$ is a hydrogen atom or a hydrocarbon or halohydrocarbon radical having 1 to 20 carbon atoms, and $R^6$ is a hydrocarbon or halohydrocarbon radical having 1 to 20 carbon atoms, (3) polyenic compounds having up to 30 carbon atoms and containing at least two carbon-carbon double bonds wherein a total of at least 2 hydrogen atoms are attached to at least one of said double bonds, (4) acetylenic compounds of the formula:

$$R^7C \equiv CR^8$$

wherein $R^7$ is a hydrogen atom or a hydrocarbon or halohydrocarbon radical having 1 to 20 carbon atoms and $R^8$ is a hydrogen atom or a hydrocarbon or halohydrocarbon radical having 2 to 20 carbon atoms and containing at least one polymerizable unsaturated group, which is preferably selected from the group consisting of vinyl, vinylidene and vinylene type double bonds, and (5) carbonyl- or thiocarbonyl-containing compounds of the formula:

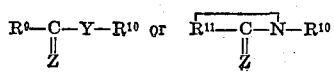

wherein $R^9$ is

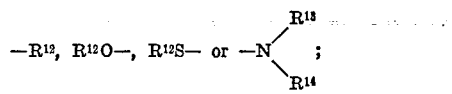

Z is an oxygen atom or a sulfur atom; Y is an oxygen atom, a sulfur atom or

$R^{10}$ is a hydrocarbon or halohydrocarbon radical having 2 to 20 carbon atoms and containing at least one polymerizable unsaturated group, which is preferably selected from the group consisting of vinyl, vinylidene and vinylene type groups, or a substituted group thereof; $R^{11}$ is a bivalent organic group having 1 to 20 carbon atoms; $R^{12}$ is a hydrocarbon or halohydrocarbon radical having 1 to 20 carbon atoms; $R^{13}$, $R^{14}$ and $R^{15}$ each is a hydrogen atom or a hydrocarbon or halohydrocarbon radical having 1 to 20 carbon atoms, and said group (B) consisting of conjugated compounds of the formula:

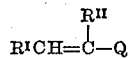

wherein $R^I$ and $R^{II}$ each is a hydrogen atom, a halogen atom or a hydrocarbon or halohydrocarbon radical having 1 to 20 carbon atoms, at least one of $R^I$ and $R^{II}$ being a hydrogen atom and Q is a nitrile or

radical in which Y′ is a halogen atom,

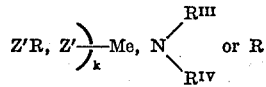

in which Z′ is an oxygen atom or a sulfur atom; R, $R^{III}$ and $R^{IV}$ each is a hydrogen atom or an organic radical, preferably a hydrocarbon or halohydrocarbon radical, having 1 to 20 carbon atoms, including the case where $R^{III}$ and $R^{IV}$ are bonded directly to each other, and in which Me is an ammonium radical or an element of Groups I to III of Mendeleev's Periodic Table and $k$ is the valency of the element and a number of from 1 to 3; said alternating interpolymer having a structure such that monomer units from group (A) alternate with monomer units from group (B), each monomer unit being linked only to monomer units from the other group.

The multicomponent interpolymer of the present invention is produced by a method which comprises contacting three to ten monomers selected from both the above-mentioned groups (A) and (B) with at least one catalyst selected from the group consisting of (1) at least one organometal halide having the formula:

$$MR'''_n X_{3-n}$$

wherein M is aluminum or boron; $R'''$ is an organic radical, preferably a hydrocarbon radical having 1 to 20 carbon atoms; X is a halogen atom; and $3 > n > 0$, or a mixture of at least two compounds having the formulas:

(a) $MR'''_n X_{3-n}$, (b) $M'R''''_3$ and (c) $M''X'_3$ wherein M, M′ and M″ are aluminum or boron; $R'''$ and $R''''$ each is an organic radical, preferably a hydrocarbon radical having 1 to 20 carbon atoms; X and X′ each is a halogen atom and $3 > n > 0$, and (2) at least one complex obtained by contacting in the presence of at least one group (B) monomer, (a′) at least one organic compound of metal of Groups IIb, IIIb and IVb of Mendeleev's Periodic Table with (b′) at least one halide of metal of Groups IIIb and IVb of said Table, at least one of (a′) and (b′) being a compound of boron or aluminum.

Said method may be carried out in the presence of oxygen or at least one organic peroxide.

When one group (A) monomer and one group (B) monomer are subjected to copolymerization, an alternating copolymer is obtained regardless of the proportion of monomers charged, and hence, the properties of the copolymer produced are uniquely determined. However, in the present copolymerization of three to ten monomers, the proportion of monomers of group (A) or the proportion of monomers of group (B) can be varied, though the proportion of the group (A) monomers to the group (B) monomers cannot be varied. Therefore, various functional groups can be introduced in any proportion into the copolymer. For example, when in alternating copolymerization of monomer (A₁) and monomer (B), monomer (A₂) having a certain function group is introduced, ther e is obtained a copolymer consisting of about 50 mole percent of (A₁) and (A₂) and about 50 mole percent of (B), and the proportion of (A₁) to (A₂) can be arbitrarily varied. From this fact, it can be understood that the multicomponent copolymerization is markedly broad in application as compared with two-component copolymerization because the properties of the copolymer produced can be varied, and has an important significance in industry. For instance, halogen-containing monomers or carbonyl-containing monomers may be introduced in an optional proportion. The introduction of a diene compound or a halogen-containing compound into the alternating compolymer results in a curable interpolymer. Alternating copolymers such as those of olefins and acrylates or of conjugated diene and acrylonitrile, are suitable as rubbers, and it is important to convert the alternating copolymer into a multicomponent interpolymer in order to arbitrarily control the characteristics of said rubbers. In addition to the rubbery polymers, polymers suitably for plastics, fibers, etc. can be obtained.

The group (A) monomers which may be used in the present invention, as understood from the formulas mentioned hereinbefore, include terminally ethylenically unsaturated compounds, internal olefinic compounds, polyenic compounds, acetylenic compounds, non-conjugated carbonyl- or thiocarbonyl-containing polymerizable compounds and halogen-substituted compounds thereof. The group (B) monomers which may be used in the present invention are acrylic acid; esters, amides, salts and acid halides thereof; acrolein; vinyl ketones and acrylonitrile, and these conjugated compounds having a halogen atom, a hydrocarbon radical or a halogen-substituted hydrocarbon radical in the α- or β-position.

Particularly important compounds as the group (A) monomers are aliphatic olefins, such as propylene and isobutylene; styrene, homologs of styrene; cyclic olefins, such as norbornenes; dienic hydrocarbons, such as butadiene and isoprene; unsaturated esters of carboxylic acids such as vinyl acetate; and halogen-substituted compounds thereof such as vinyl chloride and vinylidene chloride. Further, particularly important compounds as the group (B) monomers are acrylic acid, acrylates, acrylamides, acrylonitrile and α- or β-substituted compounds thereof.

It is characteristic here that the group (B) monomers are conjugated vinyl compounds having a nitrile radical or a carbonyl radical in a conjugated position with regard to the carbon-carbon double bond, and homologs thereof, and that they form lone pair complexes with organoaluminum halides or organoboron halides. The group (A) monomers, on the other hand, are donor compounds, and for instance, referring to the Q-e scheme proposed by Price-Alfrey, they preferably have low e values, such as 0.5 or less. Most of preferred monomers have minus e values. The number of monomers constituting the multicomponent interpolymer is three to ten in a practical sense. However, three to five component interpolymers are usually used.

Monomers which may be used in the present invention are hereinafter explained in more detail and more specifically.

The terminally ethylenically unsaturated compounds belonging to the first subgroup of the group (A) monomers are represented by the formula:

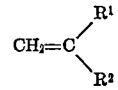

wherein $R^1$ and $R^2$ each is a hydrogen atom, a halogen atom, a hydrocarbon or halohydrocarbon radical having 1 to 20 carbon atoms.

The halogen for $R^1$ and $R^2$ includes chlorine, bromine, iodine and fluorine, and the hydrocarbon radical therefor is preferably alkyl, aryl, aralkyl, alkylaryl or cycloalkyl.

Examples of these compounds are olefins, such as ethylene, propylene, butene-1, isobutene, hexene-1, heptene-1, 2 - methylbutene - 1, 2 - methylpentene - 1, 4 - methylpentene-1, octadecene-1, 4-phenylbutene-1, styrene, α-methylstyrene, α - butylstyrene, p - methylstyrene, vinylcyclobutane, vinylcyclohexane, isopropenylbenzene, vinyl-naphthalene and allylbenzene, and halogen-containing olefinic unsaturated compounds, such as vinyl chloride, vinyl bromide, allyl chloride, allyl bromide, allyl iodide, 4 - chlorobutene - 1, 3 - chlorobutene - 1, 3 - bromopentene - 1, p - chlorostyrene, p - iodostyrene, 4-chloro-vinylcyclohexane, p - chloroallylbenzene, 2,4 - dichlorostyrene, 2,4 - difluorostyrene, 4 - chloro - 1 - vinylnaphthalene, vinylidene chloride, vinylidene bromide, 2-chloropropene-1, 1 - bromo - 1 - chloroethylene, 2 - chloroallyl chloride, methallyl chloride and 1,1-bis-(p-chlorophenyl) ethylene.

The internal olefinic compounds belonging to the second subgroup of the group (A) monomers are represented by the formula:

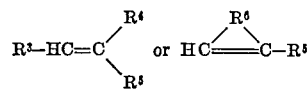

wherein $R^3$ and $R^4$ each is a hydrocarbon or halohydrocarbon radical having 1 to 20 carbon atoms; $R^5$ is a hydrogen atom, a hydrocarbon or halohydrocarbon radical having 1 to 20 carbon atoms; and $R^6$ is a hydrocarbon or halohydrocarbon radical having 1 to 20 carbon atoms. That is, these compounds are 1,2-di-substituted or 1,2,2-tri-substituted ethylenic unsaturated hydrocarbons and halohydrocarbons, and include linear and cyclic olefins.

As said compounds, there are preferable those of the above-mentioned formula in which $R^3$ and $R^4$ are alkyl, aryl, aralkyl, alkylaryl or cycloalkyl radicals, $R^5$ is a hydrogen atom or the aforesaid hydrocarbon radical and $R^6$ is a group corresponding to the aforesaid hydrocarbon radical.

As the compounds having the formula:

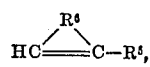

not noly monocyclic compounds but also polycyclic compounds and bridged cyclic compounds may be used.

Examples of the internal olefinic compounds are butene-2, 2 - methylbutene - 2, hexene - 2, hexene - 3, 2-methylpentene-2, heptene-2, octadecene-2, γ-methallyl chloride, 1,5 - dichloropentene - 2, 1 - chloro - 3 - methylbutene-2, 1-chloromethylbutene-2, β-methylstyrene, 4-phenylbutene-2, α,β-dimethylstyrene, β,β-dimethylstyrene, 1,1-diphenylpropene-1, stilbene, α-methylstilbene, α-methyl-p-chlorostyrene, α-chloromethylstyrene, α-propenylnaphthalene, 1 - cyclohexylpropene - 1, cyclopentene, cycloheptene, 1-methylcyclobutene - 1, 4 - chlorocyclohexene, indene, β-bromoindene, 3 - methylidene, dihydronaphthalene, acenaphthalene, norbornene, 5-methylnorbornene, 5-phenylnorbornene, 5 - chloronorbornene, 5,6 - dichloronorbornene, 7 - chloronorbornene, 2 - methylnorbornene, γ- fenchene, bornylene, 5 - chloromethylnorbornene, endocamphene, α-pinene and myrcenyl chloride.

The polyenic compounds belonging to the third subgroup of the group (A) monomers are polyenic compounds having up to 30 carbon atoms and containing at least one carbon-carbon double bond having at least two hydrogen atoms, that is, the compounds having up to 30 carbon atoms and containing at least two carbon-carbon double bonds wherein a total of at least 2 hydrogen atoms are attached to the carbon atoms of at least one of said double bonds. These are preferably general polyolefinic compounds, such as dienes, trienes and tetraenes. These polyenic compounds may preferably be hydrocarbon or halohydrocarbon compounds.

Examples of these compounds are 1,3-butadiene, isoprene, 1,3-pentadiene, 1,4-pentadiene, 1,4-hexadiene, 1,5-hexadiene, 2,3-dimethyl-1,3-butadiene, 11-ethyl-1,11-tridecadiene, myrcene, 1,3,5-hexatriene, 2-chloro-1,3-butadiene, 3-fluoro-1,4-hexadiene, p-divinylbenzene, p-isopropenyl-styrene, diallylcyclohexane, trivinylcyclohexane, 4-vinyl-cyclohexene-1,2-methyl-allylcyclopentene-1, 3-allylindene, 4,7,8,9 - tetrahydroindene, bicyclo-(2,4,0)-octadiene-2,7-fulvene, 1,3-cyclopentadiene, 5-chloro-1,3-pentadiene, 1,5-cyclooctadiene, 1,3,5-cycloheptatriene, Δ2,2-dicyclopentenyl, dicyclopentadiene, 2,5-norbornadiene, 5-methylene-2-norbornene, 5-vinyl-2-norbornene, 5-isopropenyl-2-norbornene, 2-vinyl-1,4-endomethylene-1,2,3,4,5,5a,8,8a-octahydronaphthalene, limonene and dipentene.

The acetylenic compounds belonging to the fourth subgroup of the group (A) monomers are represented by the formula, $R^7C\equiv CR^8$. In this formula, $R^7$ is a hydrogen atom, a hydrocarbon or halohydrocarbon radical having 1 to 20 carbon atoms, e.g. a saturated or unsaturated hydrocarbon or halohydrocarbon radical, such as alkyl, alkenyl, alkinyl, aryl, aralkyl, aralkenyl, alkaryl, alkenylaryl, cycloalkyl or cycloalkenyl, or said group having halogen atom(s); $R^8$ is a hydrogen atom, a hydrocarbon or halohydrocarbon radical having 2 to 20 carbon atoms and containing at least one polymerizable unsaturated group which is preferably selected from the group consisting of vinyl, vinylidene and vinylene type double bonds.

Examples of the above compounds are acetylene, methylacetylene, ethylacetylene, 1-hexine, phenylacetylene, cyclohexylacetylene, vinylacetylene, divinylacetylene, hexene-1-in-4, butenylmethylacetylene, allylethylacetylene, allylcyclohexylacetylene and allyl-(p-chlorophenyl)-acetylene.

The carbonyl or thiocarbonyl-containing compounds belonging to the fifth subgroup of the group (A) monomers are represented by the formula:

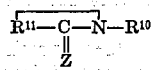

In the radical $R^9$, the hydrocarbon radicals as $R^{12}$, $R^{13}$ and $R^{14}$ are preferably alkyl, aryl, aralkyl, alkylaryl, cycloalkyl and bridged cyclic hydrocarbon groups, and these groups substituted by halogen. Substituted radicals of said hydrocarbon groups may have other substituents which do not inhibit the copolymerization reaction. Y is an oxygen atom, a sulfur atom or an $$-\underset{|}{N}R^{16}$$

group, and $R^{15}$ is the same as $R^{13}$ and $R^{14}$. Z is an oxygen or sulfur atom. $R^{10}$ is preferably a polymerizable unsaturated bond-containing hydrocarbon or halohydrocarbon radical having 2 to 20 carbon atoms. As the polymerizable unsaturated bond in the above radical, a vinyl or vinylidene group is preferable, and a vinylene group may be sometimes employed. Particularly, a hydrocarbon radical containing a vinyl group is most frequently used, and there are many cases where $R^{10}$ is a vinyl group itself. Further, an allyl or isopropenyl group is frequently used, as well. As the substituent for the hydrocarbon radical, a halogen atom is used, in particular. In addition, the substituent may be one containing a hetero atom which does not disturb the copolymerization reaction. However, it is so required as not to conjugate with the unsaturated bond. $R^{11}$ is a bivalent organic radical having 1 to 20 carbon atoms, which may contain not only a hydrocarbon or halohydrocarbon but also other hetero atom, particularly an oxygen, sulfur or nitrogen atom. For example, the type of $>C=O$, $>C=S$, $-O-$, $-S-$ or $>N-R$ may be adopted to form a part of the radical. Alternatively, it is also possible to take a polycyclic structure.

In short, these non-conjugated unsaturated compounds are common in taking the bonding mode of the type,

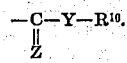

In case the compounds satisfy the above condition, the reactivities of the monomers are similar and are not so affected by the types of other portions. Specific kinds of these compounds are as follows:

As the kinds of the O-unsaturated and S-unsaturated compounds, there are unsaturated esters of carboxylic acids, thiolcarboxylic acids, thioncarboxylic acids, dithiocarboxylic acids, carbonic acid, thiol carbonic acid, thioncarbonic acid, dithiocarbonic acid, trithiocarbonic acid, carbamic acid, thiolcarbamic acid, thioncarbamic acid and dithiocarbamic acid. As the kinds of the N-unsaturated compounds, there are N-unsaturated cyclic amide compounds and compounds in which unsaturated hydrocarbon groups are bonded to nitrogen atom, such as carboxylic acid amides, thiolcarboxylic acid amides, carbamates, thiolcarbamates, thioncarbamates, dithiocarbamates, urea compounds and thiourea compounds.

The N-unsaturated cyclic amide compounds are compounds having the formula:

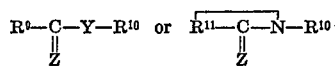

and include, for example, lactams, dicarboxylic acid imides, dithiocarboxylic acid imides, oxazolidones and alkyleneureas. These compounds may be substituted by halogens or the like.

Examples of the above compounds are:

vinyl formate, vinyl acetate,
vinylpropionate, vinyl pelargonate,
vinyl-2-ethyl-hexanecarboxylate,
vinyl stearate, ethylvinyl oxalate,
vinyl chloroacetate,
vinyl thiolacetate,
vinyl benzoate,
vinyl cyclohexanecarboxylate,
vinylnorborene-2-carboxylate,
allyl acetate,
allyl laurate, allyl-cyclobutanecarboxylate,
2-chloroallyl acetate,
isopropenyl acetate,
α-methylallyl acetate,
1-propenyl acetate,
1-isobutenyl butyrate,
methylvinyl carbonate,
S-ethyl-O-vinyl thiolcarbonate,
O-cyclohexyl-O-vinyl thioncarbonate,
phenylvinyl trithiocarbonate,
O-vinyl-N,N-dimethylcarbamate,
S-vinyl-N,N-diethylthiolcarbamate,
O-allyl-N,N-dimethylthioncarbamate,
S-isopropenyl-N,N-diethyldithiocarbamate,
N-vinylacetamide,
N-allyl-N-methylpropionic acid amide,
N-vinylbenzoic acid amide,
N-vinylthioacetamide,
N-vinylurethane-(N-vinyl-O-ethylcarbamate),
N-ethyl-N-vinyl-methylcarbamate, N-vinyl-S-phenyl-thiolcarbamate,
N-vinyl-O-ethylthioncarbamate,
N-vinyl-N-ethyl-S-ethyldithiocarbamate,
N-ethyl-N-vinylurea,
N,N-diethyl-N-vinyl-N-ethylurea,
N-phenyl-N-vinylthiourea,
N-vinyl-carbamyl chloride,
N-vinyl-N-ethylthiocarbamyl chloride,
N-vinylpyrrolidone,
N-vinylpiperidone,
N-vinylcaprolactam,
N-vinylsuccinic acid imide,
N-vinylphthalimide,
N-isopropenylphthalimde,
N-vinyloxazolidinone,
N-allyl-5-methyloxazolidinone,
N-vinyldiglycolimide,
N-vinylethyleneurea, N-ethyl-N-vinylpropyleneurea and
N-vinylethylenethiourea.

The group (B) monomers employed in the present invention are compounds having a nitrile or carbonyl group at the conjugated position with regard to the carbon-carbon double bond, and are represented by the formula:

$$R^I CH = C - Q$$
$$\quad\quad\quad\; R^{II}$$

wherein Q is a nitrile group or a $$-\underset{\underset{O}{\|}}{C}-Y'$$

group, in which Y' is as defined above.

As R, $R^{III}$ and $R^{IV}$ groups, common organic radicals having 1 to 20 carbon atoms or hydrogen atoms may be used. Prferably, each radical is a hydrocarbon or halohydrocarbon group having 1 to 20 carbon atoms or a hydrogen atom. Especially, alkyl, alkenyl, aryl, aralkyl, aralkenyl, alkylaryl, alkenylaryl, cycloalkyl and cycloalkenyl groups and these groups substituted by halogen are exemplified as the hydrocarbon or halohydrocarbon radicals. As the halogen atoms, chlorine, bromine, iodine and fluorine are used. Me is an element of Groups I to III of Mendeleev's Periodic Table or an ammonium radical, and $k$ is the valency of the element and a number of from 1 to 3. Such element includes, for example, lithium, sodium, potassium, rubidium, cesium, copper, silver, beryllium, calcium, strontium, barium, magnesium, zinc, cadmium, mercury, boron, aluminum and gallium. Monovalent salts, i.e. salts of Group I elements and ammonium salts are particularly preferable. That group

$$-N\begin{cases} R^{III} \\ R^{IV} \end{cases}$$

includes the case where $R^{III}$ and $R^{IV}$ are bonded directly to each other means that there is, for example, a morpholino, pyrrolidino or piperidino group having the formula:

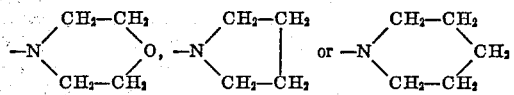

As the above compounds, there may be used acrylonitrile, acrylic acid, thiolacrylic acid, acrylates, thiolacrylates, acrylamides including N-substituted acrylamides, acryloyl halides, acrolein, vinyl ketones, and said compounds in which the hydrogen atoms of the carbon-carbon double bonds in the α- or β-positions have been substiuted by hydrocarbon radicals, halogen-containing hydrocarbon radicals or halogen atoms.

In case both $R^I$ and $R^{II}$ are not hydrogen atoms, any one of the two is a hydrocarbon radical, halogen-containing hydrocarbon radical or a halogen atom. As the hydrocarbon radical, an alkyl, aryl, aralkyl, alkylaryl or cycloalkyl group, for instance, is frequently used. The halogen employed as such or for substitution is chlorine, bromine, iodine or fluorine. That is, these compounds include α-substituted and β-substituted said acrylonitrile, acrylic acid, thiolacrylic acid, acrylates, thiolacrylates, acrylamides including N-substituted compounds, acryloyl halides, acrolein and vinyl ketones. Examples of the above compounds are methyl acrylate, ethyl acrylate, n-butyl acrylate, t-butyl-acrylate, n-amyl acrylate, 2-ethylhexyl acrylate, octadecyl acrylate, allyl acrylate, 1-propenyl acrylate, isopropenyl acrylate, isobutenyl acrylate, methyallyl acrylate, phenyl acrylate, o-tolyl acrylate, benzyl acrylate, cyclohexyl acrylate, β-terpinenyl acrylate, citronellyl acrylate, m-butenyl-1 acrylate, 2-chloroethyl acrylate, β - chloroallyl acrylate, geranyl acrylate, crotyl acrylate, cinnamyl acrylate, p - iso - butenylphenyl acrylate, cyclohexenyl acrylate, cyclopentenyl acrylate, norbornenylmethyl acrylate, indenyl acrylate, methyl thiolacrylate, ethyl thiolacrylate, acrylamide, N-methyl acrylamide, N-n-butyl acrylamide, N 2'-ethylhexyl acrylamide, N-octyl acrylamide, N-lauryl acrylamide, N-stearyl acrylamide, N-cyclohexyl acrylamide, N-tolyl acrylamide, N,N-dimethyl acrylamide, N-methyl-N-ethyl acrylamide, N,N-di-n-butyl acrylamide, acrylyl morpholine, acrylyl pyrrolidine, acryloyl chloride, acryloyl bromide, acrylic acid, thiolacrylic acid, sodium acrylate, potassium acrylate, zinc acrylate, aluminum acrylate, ammonium acrylate, acrolein, methylvinyl ketone, ethylvinyl ketone and phenylvinyl ketone. Further, the α- or β-substituted conjugated vinyl compounds include methyl methacrylate, ethyl methacrylate, butyl methacrylate, octadecyl methacrylate, benzyl methacrylate, phenyl methacrylate, tolyl methacrylate, cyclohexyl methacrylate, allyl methacrylate, crotyl methacrylate, 2-chloroethyl methacrylate, methyl thiolmethacrylate, ethyl thiolmethacrylate, methyl α-ethylacrylate, ethyl α-butylacrylate, methyl α-cyclohexyl acrylate, methyl α-phenylacrylate, methyl α-chloroacrylate, methyl α-bromoacrylate, methyl α-(p-chlorophenyl) acrylate, methacrylamide, N - ethyl methacrylamide, N-cyclohexyl methacrylamide, N,N-dimethyl methacrylamide, methacrylyl piperidine, α-ethylacrylamide, α-chloroacrylamide, α-chloromethyl acrylamide, methacryloyl chloride, α-chloroacryloyl chloride, α-ethylmethacryloyl chloride, methacrylic acid, thiolmethacrylic acid, sodium methacrylate, zinc methacrylate, aluminum methacrylate, ammonium α-fluoroacrylate, methacrolein, methylisopropenyl ketone, 1-chloro-butenylethyl ketone, methacrylonitrile, α-ethylacrylonitrile, α-cyclohexylacrylonitrile, α-chloroacrylonitrile, α-chloromethylacrylonitrile, ethyl crotonate, phenyl crotonate, crotonamide, crotyloyl chloride, crotonitrile, methyl cinnamate, butyl cinnamate, chloromethyl cinnamate, cinnamic nitrile, methyl β-ethylacrylate and methyl β-chloromethyl acrylate.

The present invention further provides a method for copolymerizing three to ten, in total, monomers selected from both groups (A) and (B), at least one monomer being selected from group (A) and at least one monomer being also from group (B). That is, the method of the present invention comprises contacting and polymerizing at least one monomer selected from each of groups (A) and (B) as defined above with at least one catalyst selected from the group consisting of (1) at least one organometal halide having the formula:

$$MR'''_n X_{3-n}$$

wherein M is aluminum or boron; R''' is a hydrocarbon radical; X is a halogen atom; and $3 > n > 0$, or a mixture of at least two compounds having the formula:

(a) $MR'''_n X_{3-n}$, (b) $M'R''''_3$ and (c) $M''X'_3$ 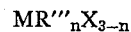

wherein M, M' and M'' are aluminum or boron; R''' and R'''' each is a hydrocarbon radical; X and X' each is a halogen atom; and $3 > n > 0$, or (2) at least one organometal halide complex obtained by contacting, in the presence of at least one group (B)

monomer, (a') at least one organic compound of a metal of Groups IIb, IIIb and IVb of Mendeleev's Periodic Table with (b') at least one halide of a metal of Groups IIIb and IVb of said table, at least one of said compounds (a') and (b') being an aluminum or boron compound.

Said method may be carried out by using an organometal halide as defined in above (1), a complex obtained from an organic compound and a halide as defined in above (2), a mixture of two or more organometal halides as defined in above (1), a mixture of two or more complexes as defined in above (2) and a mixture of (1) and (2).

In the aluminum or boron compounds having the formula, $MR'''_nX_{3-n}$, $M'R''''_3$ or $M''X'_3$ $R''''$ and $R''''$ are, preferably, hydrocarbon radicals having 1 to 20 carbon atoms. Preferable radicals are, for example, alkyl, alkenyl, aryl, aralkyl, alkylaryl and cycloalkyl. Specifically, methyl, ethyl, propyl, butyl, hexyl, octyl, decyl, dodecyl, stearyl, phenyl, tolyl, naphthyl, benzyl, cyclopentadienyl and cyclohexyl radicals may be exemplified. As X and X', chlorine, bromine, iodine and fluorine are used. The $n$ is an arbitrary value between 0 and 3, exclusive, and not limited to an integer. Especially, an arbitrary number of 1 to 2 is efficiently used. More specifically, 1, 1.5 and 2 are useful.

Examples of these compounds are as follows: The compounds having the formula, $MR'''_nX_{3-n}$ include methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum diiodide, allylaluminum dichloride, ethylaluminum sesquichloride, ethylaluminum sesquibromide, ethylaluminum sesquifluoride, methylaluminum sesquichloride, diethylaluminum chloride, diethylaluminum fluoride, ethylphenylaluminum chloride, dicyclohexylaluminum chloride, methylboron dichloride, ethylboron dichloride, ethylboron diiodide, butylboron dichloride, hexylboron dichloride, dodecylboron dichloride, phenylboron dichloride, benzylboron dichloride, cyclohexylboron dichloride, diethylboron bromide, dipropylboron chloride, dibutylboron chloride, dihexylboron chloride, ethylvinylboron chloride, and dicyclopentadienylboron chloride. The compounds having the formula, $M'R''''_3$ include trimethylaluminum, triethylaluminum, tripropylaluminum, tributylaluminum, trihexylaluminum, tridecylaluminum, triphenylaluminum, tricyclohexylaluminum, tribenzylaluminum, trimethylboron, triethylboron, tributylboron, trihexylboron, diethylphenylboron, diethyl-p-tolylboron and tricyclohexylboron. The compounds having the formula, $M''X'_3$ include aluminum trichloride, aluminum tribromide, aluminum triiodide, partially fluorinated aluminum chloride, boron trichloride, boron trifluoride, boron tribromide and boron triiodide.

The organic compounds of metals of Group IIb, IIIb, or IVb of Mendeleev's Periodic Table which are used in the present invention as components of the catalyst (2) are those having as metal components zinc, cadmium, mercury, boron, aluminum, gallium, indium, thallium, geranium, tin and lead. Particularly, the metal components of zinc, boron, aluminum and tin are frequently employed. As the organic groups, hydrocarbon groups or derivative groups thereof are preferable. Particularly effective compounds are those having alkyl, alkenyl, aryl, aralkyl, alkylaryl, and cycloalkyl groups. The metals are used also in the case where the compounds have other groups than the organic groups. Particularly useful are organometallic compounds having the formula, $$M'''R^v_nX''_{p-n}$$

wherein $M'''$ is a metal of Group IIb, IIIb or IVb of Mendeleev's Periodic Table; $R^v$ is a hydrocarbon radical having 1 to 20 carbon atoms; $X''$ is a halogen atom; $p$ is the valency of the metal; and $n$ is an arbitrary value of 1 to $p$. The compounds are particularly effective, in general, when $n=p$, i.e. $M'''R^v_p$. If necessary, other organic compounds of metals of Group IIb, IIIb or IVb of the Periodic Table may, of course, be used as well.

Examples of the above compounds are diethylzinc ethylzinc chloride, diethylcadmium, diethylmercury, diphenylmercury, triethylboron, tributylboron, tricyclohexylboron, diethylboron bromide, triethylaluminum, tributylaluminum, trihexylaluminum, tricyclohexylaluminum, vinyldiethylaluminum, diethylaluminum chloride, ethylaluminum sesquichloride, ethylaluminum dichloride, trimethylgallium, triethylgallium, triethylindium, tetraethylgermanium, tetramethyltin, tetraethyltin, tetraisobutyltin, dimethyldiethyltin, tetraphenyltin, tetrabenzyltin, diethyldiphenyltin, triethyltin chloride, diethyltin dichloride, ethyltin trichloride, tetramethyllead, tetraethyllead, dimethyldiethyllead and triethyllead chloride.

On the other hand, the metal halides employed are halides of metals of Group IIIb or IVb of Mendeleev's Periodic Table. For example, compounds of boron, aluminum, gallium, indium, thallium, germanium, tin and lead may be used. The halogens to be employed are chlorine, bromine, iodine and fluorine. As these metal halides, those having other groups than halogens are also permitted. Particularly preferable metal halides in the present process are compounds having the formula:

$$M''''X'''_mR^{vi}_{q-m}$$

wherein $M''''$ is a metal of Group IIIb or IVb of Mendeleev's Periodic Table; $R^{vi}$ is a hydrocarbon radical having 1 to 20 carbon atoms; $X'''$ is a halogen atom; $q$ is the valency of the metal; and $m$ is an arbitrary value of 1 to $q$. Generally, favorable results are liable to be obtained when $m=q$, i.e. $M''''X'''_q$. If necessary, other halides of metals of Group IIIb or IVb of the Periodic Table may, of course, be used. The term "arbitrary value" for $m$ and $n$ means that the value is not limited to integer, that is, $p \geq n \geq 1$ and $q \geq m \geq 1$.

Examples of metal halides useful in the present process are boron trichloride, boron trifluoride, boron tribromide, boron triiodide, ethylboron dichloride, diethylboron chloride, aluminum trichloride, aluminum tribromide, aluminum triiodide, partially fluorinated aluminum chloride, ethylaluminum dichloride, methylaluminum dibromide, ethylaluminum sesquichloride, diethylaluminum chloride, gallium trichloride, gallium dichloride, germanium tetrachloride, tin tetrachloride, tin tetrabromide, tin tetraiodide, ethyltin trichloride, methyltin trichloride, phenyltin trichloride, dimethyltin dibromide, diethyltin dichloride, diisobutyltin dichloride, triethyltin chloride, lead tetrachloride, and diethyllead dichloride.

In the catalyst (2), in case a combination of at least one organic compound of metal of Groups IIb, IIIb and IVb of Mendeleev's Periodic Table and at least one halide of metal of Groups IIIb and IVb of said table is to be used, the organometallic compound and the metal halide are used without previous mixing. The mixing of these components is effected at least in the presence of a group (B) monomer. Favorable results are liable to be obtained particularly when the group (B) monomer and the metal halide are previously mixed, followed by addition of the organometallic compound.

In the polymerization with the above-mentioned catalyst in the present process, the metal halide used forms a complex with the nitrile or carbonyl group of the group (B) monomer, which gives the alternating regularity to the sequence structure of monomer units in the copolymerization with the group (A) monomers. In this case, the presence of an aluminum or boron compound having both an organic group and a halogen atom is required. Otherwise, it is impossible to selectively obtain a copolymer having an alternating chain. The catalyst activity against this type of alternating copolymerization is remarkably increased when both an organic group and a halogen atom are present in the aluminum or boron compound, and this is one of the characteristics of the present invention. For example, with only trialkylboron, the polymerization activity is low and no alternating copolymer is obtained. That is, particularly excellent catalyst system in the present invention is alkylaluminum halides and alkylboron halides. In particular, ethylaluminum sesquichloride, ethylaluminum dichloride, diethylboron halide and ethylboron dihalide or mixtures thereof are superior.

In order to obtain selectively an alternating copolymer in the present process, it is necessary that each monomer does not cause homopolymerization under the conditions of the present process. The copolymerization reaction in the present invention is considered to be a kind of radical polymerization which can be called coordination radical polymerization. However, some of the group (A) monomers can be cationically polymerized with some of the above-mentioned catalysts. Under such conditions, there is a possibility of the radical interpolymerization and the cationic homopolymerization of the group (A) monomer being caused simultaneously, whereby the group (A) monomers are unnnecessarily consumed. However, in general, the cationic polymerization of the group (A) monomer is greatly retarded by the presence of the group (B) monomers, and in many cases, substantially no cationic polymerization takes place. When cationic polymerization is, nevertheless, caused, the catalyst may be replaced with others, or it is more desirable to effect the copolymerization at a low concentration of the group (A) monomers. On the other hand, if the group (B) monomers tend to cause homopolymerization by a radical reaction, the amount of a catalyst, particularly halogen-containing metal compound component, may be increased to form complexed monomers in a large amount. For instance, halogen-containing metal compounds may be used in an amount equimolar to the group (B) monomers. However, such complexes are generally reversible, and recycled into the copolymerization reaction system, and hence, the selection of suitable conditions enables an alternating copolymer to be selectively produced with a small amount of catalyst.

In practicing the present invention, the catalyst components may be used in an optional proportion, though a proportion of 0.0005 to 10 moles, particularly 0.005 to 1.5 moles, per mole of the group (B) monomer is frequently adopted. Where two or more catalyst components are used, an alternating copolymer is apt to be effectively obtained when a relatively small amount of an organic group-containing metal compound is used and a relatively large amount of a halogen-containing metal compound is used.

In the present process, copolymerization can be promoted with oxygen or an organic peroxide. Further, the addition of these components enables the copolymerization to proceed effectively with a relatively small amount of a catalyst. Such promoting action appears effectively even at a low temperature such as —78° C. Oxygen or an organic peroxide may be used in any proportion, though the use thereof in an amount of at least 0.01 mole percent based on the amount of the catalyst components is effective. That is, oxygen or an organic peroxide is often used in an amount of 0.01 to 100 mole percent, preferably 0.1 to 20 mole percent, based on the amount of the catalyst. Based on the amount of the group (B) monomers, the amount of oxygen or organic peroxide is preferably 0.001 to 20 mole percent, particularly 0.01 to 5 mole percent.

The organic peroxides used in the present invention are general organic compounds having peroxide bonds, and include, for example, diacyl peroxides, ketone peroxides, aldehyde peroxides, ether peroxides, hydroperoxides, dihydrocarbyl peroxides, peracid esters, dihydrocarbyl percarbonates and percarbamates. Specific examples of these compounds are benzoyl peroxide, lauroyl peroxide, 2,4-dichlorobenzoyl peroxide, 4-chlorobenzoyl peroxide, acetyl peroxide, stearoyl peroxide, phthaloyl peroxide, methylethylketone peroxide, cyclohexanone peroxide, t-butyl hydroperoxide, p-menthane hydroperoxide, diisopropylbenzene hydroperoxide, cumene hydroperoxide, di-t-butyl peroxide, dicumyl peroxide, t-butyl cumyl peroxide, t-butyl perbenzoate, t-butyl perisobutyrate, t-butyl peracetate, t-butyl peroxypivalate, phenyl percarbamate, diisopropyl percarbonate and t-butyl-perisopropyl carbonate. However, peroxides useable in the present invention are not limited to the above-mentioned compounds. There is seen such a tendency that the higher the radical decomposition rates of these peroxides, the greater the promoting actions thereof.

The polymerization temperature may optionally be selected from temperatures ranging from such a low temperature as —150° C. to such a high temperature as +100° C.

The copolymerization generally proceeds easily at ordinary pressure. However, when normally gaseous monomers are subjected to copolymerization, a pressure such as up to 100 kg./cm.$^2$ may be used.

The process of the present invention may be effected either according to bulk polymerization in liquid monomers or in the presence of common inert vehicles. These vehicles include common hydrocarbons and halogen-containing hydrocarbon compounds. For example, propane, butane, pentane, hexane, heptane, octane, ligroin, petroleum ether, other petroleum group mixed solvents, benzene, toluene, xylene, cyclohexane, methylcyclohexane, methylene dichloride, ethylene dichloride, trichloroethylene, tetrachloroethylene, butyl chloride, chlorobenzene and bromobenzene may be exemplified. Compounds forming stable complexes or reacting with catalysts components are not desirable as solvents.

After the completion of the polymerization reaction, after-treatments are effected according to ordinary procedures to purify and recover the polymerization product. For example, alcohol treatment, alcohol-hydrochloric acid treatment, hydrochloric acid-water treatment, alkali treatment and the like, or after-treatment procedures employed in conventional polymerization processes using Lewis acids or Ziegler-Natta type catalyst may optionally be applied. It is also possible to adopt a process for separating and recovering the catalyst components from the polymerization product, without decomposing the catalyst components, by adding compounds capable of forming complexes therewith.

The following examples illustrate the present invention in more detail, but the present invention is not limited to the examples.

EXAMPLE 1

A 300-ml. glass autoclave equipped with a stirrer was flushed with nitrogen, was charged with 62 ml. of toluene and 0.125 mmol. of benzoyl peroxide and cooled to —78°. To the reactor were added 200 mmol. of methyl acrylate, 100 mmol. of propylene and 100 mmol. of vinyl chloride in this order and then liquefied. Further, a solution of 100 mmol. of ethylaluminum sesquichloride (AlEt$_{1.5}$Cl$_{1.5}$) in 38 ml. of toluene was added. Thereafter, the temperature was elevated to 0° C., and polymerization was continued for 5 hrs. with stirring. Unreacted gas was purged and the content of the reactor was discharged into a large amount of methanol. Subsequently, the coagulated solids were throughly washed with methanol and dried in vacuum at 40° C. to obtain 9.20 g. of a white solid copolymer.

The result of elementary analysis of the copolymer was C: 60.16%, H: 8.26% and Cl: 6.87%. The amount of methyl acrylate measured according to saponification method was 52.4 mole percent based on the copolymer, the amount of vinyl chloride measured from halogen was 13.1 mole percent and the amount of propylene was 34.5 mole percent.

EXAMPLE 2

In a nitrogen atmosphere, the same reactor as in Example 1 was charged with 62 ml. of toluene and 0.125 mmol. of benzoyl peroxide and cooled to $-78°$ C. To the reactor were added 100 mmol of methyl acrylate, 100 mmol. of acrylonitrile, 200 mmol. of vinylidene chloride and 200 mmol. of ethylaluminum sesquichloride (a solution in 38 ml. of toluene) in this order, and the temperature was elevated to $0°$ C. The monomer mixture was polymerized for 5 hrs. with stirring to obtain 1.34 g. of a terpolymer. The elementary analysis values of the copolymer were C: 38.19%, H: 3.65%, N: 3.41% and Cl: 44.48%. The contents of the respective monomers, calculated from the chlorine, the results of saponification method and the analysis values of nitrogen, were 52.6 mole percent vinylidene chloride, 27.0 mole percent methyl acrylate and 20.4 mole percent acrylonitrile.

EXAMPLE 3

A 200-ml. four-necked flask was evacuated and flushed with nitrogen. In a nitrogen atmosphere, the flask was charged with 75 ml. of toluene, 10 mmol. of methyl acrylate and 150 mmol. of acrylonitrile. Subsequently, 50 mmol. of ethylaluminum sesquichloride (containing 25 ml. of toluene) was added at $-78°$ C. After elevating the temperature to $0°$ C., 200 mmol. of styrene was added with stirring, and the compounds were reacted for 1 hr. The resulting light yellow, homogeneous and transparent reaction liquid was treated in the same manner as in Example 1 to obtain 31.2 g. of a white solid copolymer. The intrinsic viscosity of this copolymer measured in acetone solution at $30°$ C. was 6.15 dl./g. The result of the elementary analysis was C: 75.71%, H: 7.19%, N: 1.46%, and the composition of the interpolymer obtained was calculated as styrene 45.7 mole percent, methyl acrylate 44.7 mole percent and acrylonitrile 9.4 mole percent.

EXAMPLE 4

In a nitrogen atmosphere, the same reactor as in Example 1 was charged with 15 ml. of toluene and 0.125 mmol. of benzoyl peroxide. After cooling the flask to $-78°$ C., 250 mmol. of methyl acrylate and 500 mmol. of propylene were added and liquefied. The flask was further charged with 25 mmol. of ethylaluminum sesquichloride, and the temperature was elevated to $0°$ C. Thereafter, 25 mmol. of dicyclopentadiene was added with stirring, and the monomer mixture was polymerized for 5 hrs. to obtain 17.35 g. of a white solid copolymer. This copolymer gelled during treatment and became insoluble.

Polymerization was effected at $0°$ C., using the same monomer mixture as above, except that divinylbenzene was substituted for the dicyclopentadiene, and the ethylaluminum sesquichloride was added finally, changing the addition order of compounds, whereby 9.55 g. of a white copolymer was obtained. Further, a terpolymer obtained by use of butadiene in place of the dicyclopentadiene showed an iodine number of 146.

EXAMPLE 5

In a nitrogen atmosphere, the same reactor as in Example 1 was charged with 15 ml. of toluene. After the reactor being cooled to $-78°$ C., 0.125 mmol. of benzoyl peroxide, 500 mmol. of propylene, 250 mmol. of methyl acrylate and 100 mmol. of 1,5-cyclooctadiene were added. Thereafter, 25 mmol. of ethylaluminum sesquichloride was added while stirring the mixture uniformly. The temperature elevated to $0°$ C. and the monomer mixture was reacted for 5 hrs. Subsequently, the reaction liquid was treated in methanol containing phenyl-$\beta$-naphthylamine as stabilizer to obtain 11.48 g. of a terpolymer having an iodine number of 6.4. From said iodine number and from the analysis of the ester group content, it was found that the composition of the copolymer was 1.8 mole percent cyclooctadiene, 56.4 mole percent methyl acrylate and 41.9 mole percent propylene. To this copolymer were added, per 100 parts by weight of the copolymer, 1 part by weight of stearic acid, 5 parts by weight of zinc white, 50 parts by weight of HAF black, 1.5 parts by weight of sulfur, 1.5 parts by weight of tetramethylthiuram disulfide and 0.5 part by weight of mercaptobenzothiazole, and the mixture was cured at $160°$ C. and 50 kg./cm.$^2$ for 40 minutes to obtain a cured product having a tensile strength of 114 kg./cm.$^2$ and an elongation of 300%.

EXAMPLE 6

Polymerization was effected under the same conditions as in Example 5, except that isobutylene was used in place of the propylene, whereby 34.45 g. of a terpolymer was obtained. The iodine value of the terpolymer was 1.6 and the composition of the terpolymer was calculated as isobutylene 46.1 mole percent, cyclooctadiene 0.7 mole percent and methyl acrylate 53.2 mole percent.

EXAMPLE 7

Into a 50-ml. glass reactor were charged 160 mmol. of isobutylene and 4 mmol. of ethylboron dichloride in a nitrogen atmosphere at $-78°$ C., and to the resulting mixture was added a mixture of 80 mmol. of ethyl acrylate and 16 mmol. of 5-isopropylidene-2-norbornene. The temperature was elevated to $-20°$ C., at which reaction was effected for 3 hours. The reaction product was treated with methanol to obtain 12.4 g. of a terpolymer having an iodine value of 13.5.

The elementary analysis showed that the terpolymer had C: 68.49%, H: 10.05% and O: 18.53%, and the terpolymer consisted of 47.0 mole percent of isobutylene, 4.5 mole percent of isopropylidene norbornene and 48.5 mole percent of ethyl acrylate.

EXAMPLE 8

Into a 50-ml. glass reactor were charged 50 mmol. of styrene, 10 mmol. of p-chlorostyrene, 30 mmol. of acrylonitrile and 10 mmol. of methyl acrylate under an argon atmosphere, and at $-20°$ C. 30 mmol. of ethylaluminum sesquichloride (a solution in 15 ml. of toluene) and 0.3 mmol. of benzoyl peroxide were added thereto. The resulting mixture was subjected to reaction for 2.5 hrs. The reaction was stopped by adding methanol to the reaction mixture. The product was dissolved in acetone, precipitated with methanol and then dried at $40°$ C. by a vacuum drier to obtain 3.05 g. of a copolymer. The elementary analytical values were C: 77.00%, H: 6.72%, N: 4.03%, O: 7.62% and Cl: 3.55%. The composition of the copolymer was calculated as styrene 43.1 mole percent, p-chlorostyrene 9.1 mole percent, acrylonitrile 26.1 mole percent and methyl acrylate 21.6 mole percent. From these data, it was found that the proportion of the group (A) monomers was 52.2 mole percent and that of the group (B) monomers was 47.8 mole percent.

EXAMPLE 9

Into a 50-ml. glass reactor under an argon atmosphere were charged 10 ml. of toluene, 10 mmol. of methyl $\alpha$-chloroacrylate, 15 mmol. of methyl methacrylate and 25 mmol. of ethylaluminum sesquichloride (12.5 ml. of toluene solution) and mixed uniformly. The resulting mixture was cooled to $-78°$ C., at which temperature 10 mmol. of 5-ethylidene-2-norbornene and 25 mmol. of phenyl acetylene were added to the mixture. The resulting mixture was subjected to reaction at $-78°$ C. for 24 hours, after which methanol was added thereto to stop the polymerization to obtain 0.20 g. of a copolymer. The values of elementary analysis of the copolymer were as follows: C: 63.11%, H: 5.36%, O: 14.98% and Cl: 12.99%, and from these values, the composition of the copolymer was calculated as ethylidene norbornene 6.7 mole percent, phenyl acetylene 39.7 mole percent, methyl $\alpha$-chloroacrylate 42.1 mole percent and methyl methacrylate 11.5 mole percent. From these data, it can be confirmed that the copolymer contains 46.4 mole percent of the group (A) monomers and 53.6 mole percent of the group (B) monomers.

EXAMPLE 10

Into a 100-ml. glass reactor under an argon atmosphere were charged 10 ml. of toluene, 40 mmol. of methyl acrylate and 20 mmol. of tin tetrachloride (4 ml. of toluene solution) and mixed to obtain a white complex. Thereto was added 20 mmol. of triethylaluminum (20 ml. of n-heptane solution) at −78° C. to obtain an opaque solution. To the solution were added 50 mmol. of styrene, 50 mmol. of vinylidene chloride and 50 mmol. of 5-ethylidene-2-norbornene, and the resulting mixture was subjected to reaction at −78° C. for 24 hrs. while introducing a nitrogen gas containing 5% by volume of oxygen thereinto. Methanol was added thereto to stop the reaction, after which the content of the reactor was treated to obtain 4.60 g. of a copolymer. The copolymer was dissolved in acetone and then re-precipitated from methanol to purify the polymer. The values of the elementary analysis of the thus purified polymer were C: 74.41%, O: 17.84%, Cl: 2.15% and H: 7.28% and the iodine value was 2.2. From these data the composition of the copolymer was calculated as styrene 44.5 mole percent, vinylidene chloride 2.8 mole percent, 5-ethylidene-2-norbornene 0.8 mole percent and methyl acrylate 51.9 mole percent. The total amount of the group (A) monomers was 48.1 mole percent.

EXAMPLE 11

Into a 500-ml. four-necked flask under an argon atmosphere were charged 100 ml. of bromobenzene, 150 mmol. of ethylaluminum dichloride (75 ml. of n-heptane solution) and 200 mmol. of acrylonitrile in this order to obtain a homogeneous solution. At −78° C. 250 mmol. of 5-chloromethyl-2-norbornene, 250 mmol. of dicyclopentadiene and 250 mmol. of vinyl acetate were added to the solution, and the resulting mixture was subjected to reaction with stirring for 24 hrs. to obtain 0.51 g. of a copolymer. The values of the elementary analysis of the copolymer were C: 75.11%, H: 7.21%, N: 9.01%, O: 4.66% and Cl: 3.17%. From these data, it was confirmed that the copolymer consisted of 7.6 mole percent of 5-chloromethyl-2-norbornene, 25.5 mole percent of dicyclopentadiene, 12.3 mole percent of vinyl acetate and 54.6 mole percent of acrylonitrile.

EXAMPLE 12

Into a 50-ml. glass reactor under an argon atmosphere were charged at room temperature 20 ml. of n-heptane, 100 mmol. of styrene, 10 mmol. of acrylonitrile, 15 mmol. of α-chloroacrylonitrile and 20 mmol. of methyl methacrylate. To the resulting mixture was added 20 mmol. of ethylaluminum sesquichloride, and the resulting mixture was subjected to reaction for 24 hrs. to obtain 1.33 g. of a copolymer. The values of the elementary analysis of the copolymer were C: 76.94%, H: 7.43%, N: 2.26%, O: 10.93% and Cl: 2.47%. From these data, it was confirmed that the copolymer consisted of 51.2 mole percent of styrene, 8.9 mole percent of acrylonitrile, 6.8 mole percent of chloroacrylonitrile and 33.1 mole percent of methyl methacrylate, and the total amount of the group (B) monomers was 48.8 mole percent.

EXAMPLE 13

Into a 1-l. four-necked flask under an argon atmosphere at 0° C. were charged 1.25 moles of styrene, 1.25 moles of vinylidene chloride, 1.25 moles of vinyl acetate, 1.25 moles of 5-ethylidene-2-norbornene and 1 mole of acrylonitrile, and to the resulting mixture was added 1 mole of ethylaluminum sesquichloride. The resulting mixture was subjected to reaction for 24 hrs. to obtain 8.65 g. of a copolymer. The values of the elementary analysis of the copolymer were C: 82.60%, H: 7.16%, N: 8:17%, O: 3.17% and Cl: 0.75%, from which the composition was calculated as 39.0 mole percent of styrene, 0.8 mole percent of vinylidene chloride, 6.5 mole percent of ethylidene norbornene, 7.8 mole percent of vinyl acetate and 45.9 mole percent of acrylonitrile. The total amount of the group (A) monomers was 54.1 mole percent.

EXAMPLE 14

Into a 50-ml. glass reactor under an argon atmosphere at −20° C. was charged 20 mmol. of isobutylene, and thereto were added 50 mmol. of 5-chloromethyl-2-norbornene, 50 mmol. of vinyl acetate in this order, and these were mixed uniformly. To the resulting mixture were added 20 mmol. of acrylonitrile, 20 mmol. of methyl thiolacrylate and 20 mmol. of diethylboron chloride (20 ml. of n-heptane solution), and the resulting mixture was subjected to reaction for 24 hrs. to obtain 0.35 g. of a copolymer. The values of the elementary analysis of the copolymer were C: 66.22%, H: 8.23%, N: 6.54%, O: 6.72%, Cl: 3.79% and S: 5.93%, from which the copolymer was confirmed to consist of 34.5 mole percent of isobutylene, 8.0 mole percent of chloromethyl norbornene, 8.8 mole percent of vinyl acetate, 34.9 mole percent of methyl thiolacrylate. The total amount of the group (A) monomers was 51.3 mole percent and the total amount of the group (B) monomers was 48.8 mole percent.

EXAMPLE 15

Into a 50-ml. glass reactor under an argon atmosphere at −20° C. were charged 20 ml. of toluene, 50 mmol. of isobutylene, 20 mmol. of 5-chloromethyl-2-norbornene, 20 mmol. of 5-ethylidene-2-norbornene, 40 mmol. of methyl acrylate and 10 mmol. of acrylic acid in this order, and to the resulting mixture was added 10 mmol. of ethylboron dichloride (10 ml. of heptane solution). The resulting mixture was subject to reaction for 3 hrs. to obtain 0.22 g. of a copolymer. The values of the elementary analysis of the copolymer were C: 66.45%, H: 9.53%, O: 21.09% and Cl: 1.65%. From these data, it was confirmed that the copolymer consisted of 42.4 mole percent of isobutylene, 3.6 mole percent of chloromethylnorbornene, 3.0 mole percent of ethylidene norbornene, 0.1 mole percent of acrylic acid and 50.9 mole percent of methyl acrylate. That is, the total amount of the group (A) monomers was 49.0 mole percent and the total amount of the group (B) monomers was 51.0 mole percent.

What is claimed is:

1. An interpolymer consisting essentially of an alternating interpolymer of three to ten monomers selected from monomer groups (A) and (B), wherein at least one monomer is selected from group (A) and at least one monomer is selected from group (B), said group (A) consisting of
   (1) terminally ethylenically unsaturated compounds having the formula:

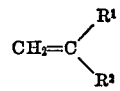

wherein $R^1$ and $R^2$ each is a hydrogen atom, a halogen atom, a hydrocarbon or halohydrocarbon radical having 1 to 20 carbon atoms, (2) internal olefinic compounds having the formula:

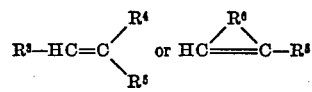

wherein $R^3$ and $R^4$ each is a hydrocarbon or halohydrocarbon radical having 1 to 20 carbon atoms, $R^5$ is a hydrogen atom or a hydrocarbon or halohydrocarbon radical having 1 to 20 carbon atoms, and $R^6$ is a hydrocarbon or halohydrocarbon radical having 1 to 20 carbon atoms, (3) polyenic compounds having up to 30 carbon atoms and containing at least two carbon-carbon double bonds wherein a total of at least 2 hydrogen atoms are attached to at least one of said double bonds, (4) acetylenic compounds having the formula:

$$R^7C\equiv CR^8$$

wherein $R^7$ is a hydrogen atom or a hydrocarbon or halohydrocarbon radical having 1 to 20 carbon atoms and $R^8$ is a hydrogen atom or a hydrocarbon or halohydrocarbon radical having 2 to 20 carbon atoms and containing at least one polymerizable unsaturated group which is selected from the group consisting of vinyl, vinylidene and vinylene type double bonds.

(5) carbonyl- or thiocarbonyl-containing compounds of the formula:

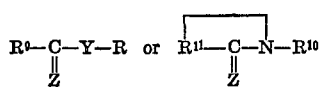

wherein $R^9$ is

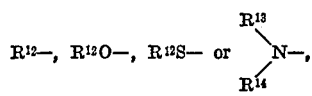

Z is an oxygen or sulfur atom; Y is an oxygen atom, a sulfur atom or an

group; $R^{10}$ is a hydrocarbon or halohydrocarbon radical having 2 to 20 carbon atoms and containing at least one polymerizable unsaturated group which is selected from the group consisting of vinyl, vinylidene and vinylene type groups; $R^{11}$ is a bivalent organic residue having 1 to 20 carbon atoms; $R^{12}$ is a hydrocarbon or halohydrocarbon radical having 1 to 20 carbon atoms; and $R^{13}$, $R^{14}$ and $R^{15}$ each is a hydrogen atom or a hydrocarbon or halohydrocarbon radical having 1 to 20 carbon atoms, and said monomer group (B) consisting of conjugated compounds of the formula:

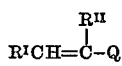

where $R^I$ and $R^{II}$ each is a hydrogen atom, a halogen atom or a hydrocarbon or halohydrocarbon radical having 1 to 20 carbon atoms, at least one of $R^I$ and $R^{II}$ being a hydrogen atom; and Q is a nitrile or

group, wherein Y' is a halogen atom, or a

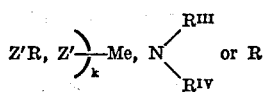

group in which Z' is an oxygen atom or a sulfur atom; R, $R^{III}$ and $R^{IV}$ each is a hydrogen atom or a hydrocarbon or halohydrocarbon radical having 1 to 20 carbon atoms, including the case where $R^{III}$ and $R^{IV}$ are bonded directly to each other; and in which Me is an ammonium radical or an element of Groups I to III of Mendeleev's Periodic Table and $k$ is the valency of the metal and a number from 1 to 3; said alternating interpolymer having a structure such that monomer units from group (A) alternate with monomer units from group (B), each monomer unit being linked only to monomer units from the other group.

2. An interpolymer according to claim 1, wherein the group (A) monomers have "$e$" values of up to 0.5 in the Q-e scheme defined by Price-Alfrey.

3. An interpolymer according to claim 1, wherein the number of monomers constituting the interpolymer is three to five.

4. An interpolymer according to claim 1, wherein the group (A) monomers are selected from (1), (2) and (3).

5. An interpolymer according to claim 4, wherein the group (B) monomers are selected from compounds of the formula:

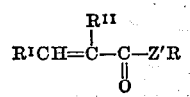

wherein $R^I$, $R^{II}$, Z' and R have the same meanings as defined in claim 1.

6. An interpolymer according to claim 4, wherein the group (B) monomers are selected from compounds of the formula:

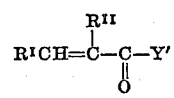

wherein Y' is a halogen atom or OR or R group and wherein R is a hydrocarbon or halohydrocarbon radical of 1 to 20 carbon atoms, or a hydrogen atom; and $R^I$ and $R^{II}$ have the same meanings as defined in claim 1.

7. An interpolymer according to claim 4, wherein one of the monomers is acrylonitrile.

8. An interpolymer according to claim 1, wherein at least one monomer is selected from (5).

9. An interpolymer according to claim 8, wherein one or more group (B) monomers are selected from the group consisting of acrylonitrile, acrylic esters and acrylamides.

10. An interpolymer according to claim 1, wherein at least one monomer is selected from dienes.

11. An interpolymer according to claim 10, wherein one or more group (B) monomers are selected from the group consisting of acrylonitrile, and acrylic esters.

12. An interpolymer according to claim 1, wherein one or more group (B) monomers are selected from the group consisting of acrylic acid, acryloyl halides, acrylic esters, acrylamide, n-substitued acrylamides and acrylonitrile.

13. An interpolymer according to claim 1, wherein one of the monomers is a halogen-containing compound.

14. An interpolymer according to claim 1, wherein one or more group (B) monomers are selected from the group consisting of acrolein and vinyl ketones.

15. An interpolymer according to claim 1, wherein the group (A) monomers are selected from the group consisting of aliphatic olefins, styrene and styrenes substituted with at least one hydrocarbon radical, cyclic olefins, dieenic hydrocarbons, unsaturated esters of carboxylic acids and halogen-substituted compounds thereof; and the group (B) monomers are selected from the group consisting of acrylic acid, acrylic esters, acrylic amides and acrylonitrile and $\alpha$- or $\beta$-halogen-, hydrocarbon radical- or halohydrocarbon radical-substituted compounds thereof.

16. An interpolymer according to claim 1, wherein the group (A) monomers are selected from the group consisting of propylene, isobutylene, styrene or styrenes substituted with halogen atom(s) or hydrocarbon- or halohydrocarbon-radical(s), dienic hydrocarbons, vinyl chloride, vinylidene chloride and vinyl acetate, and the group (B) monomers are selected from the group consisting of acrylic acid, acrylic esters, acrylic amides and acrylonitrile.

17. An interpolymer according to claim 1, wherein the monomers are selected from the group consisting of propylene, isobutylene, styrene, butadiene, vinyl chloride, vinylidene chloride, vinyl acetate, acrylic esters and acrylonitrile.

18. An interpolymer according to claim 1, wherein at least one monomer is selected from the group consisting of propylene, isobutylene and styrene.

19. An interpolymer according to claim 1 wherein the terminally ethylenically unsaturated compounds of (1) are selected from the group consisting of ethylene, propylene, butene-1, isobutene, hexene-1, heptene-1, 2-methylpentene-1, 4-methyl-pentene-1, octadecene-1, 4-phenylbutene-1, styrene, α-methylstyrene, α-butylstyrene, p-methylstyrene, vinylcyclobutane, vinylcyclohexane, isopropenylbenzene, vinylnaphthalene and allylbenzene, vinyl chloride, vinyl bromide, allyl chloride, allyl bromide, allyl iodide, 4-chlorobutene-1, 3-chlorobutene-1, 3-bromopentene-1, p-chlorostyrene, p-iodostyrene, 4-chlorovinylcyclohexane, p-chloroallylbenzene, 2,4-dichlorostyrene, 2,4-difluorostyrene, 4-chloro - 1 - vinylnaphthalene, vinylidene chloride, vinylidene bromide, 2-chloropropene-1, 1-bromo-1-chloroethylene, 2-chloroallyl chloride, methallyl chloride, 1,1-bis-(p-chlorophenyl)ethylene;

the internal olefinic compounds of (2) are selected from the group consisting of butene-2, 2-methylbutene-2, hexene-2, hexene-3, 2-methylpentene-2, heptene-2, octadecene-2, γ-methallyl chloride, 1,5-dichloropentene-2, 1-chloro-3-methylbutene-2, 1-chloromethylbutene-2, β-methylstyrene, 4-phenylbutene-2, α,β-dimethylstyrene, β,β-dimethylstyrene, 1,1-diphenylpropene-1, stilbene, α-methylstilbene, α-methyl-p-chlorostyrene, α-chloromethylstyrene, α-propenylnaphthalene, 1-cyclohexylpropene-1, cyclopentene, cycloheptene, 1-methylcyclobutene-1, 4-chlorocyclohexene, indene, β-bromoindene, 3-methylidene, dihydronaphthalene, acenaphthalene, norbornene, 5-methylnorbornene, 5-phenylnorbornene, 5-chloronorbornene, 5,6-dichloronorbornene, 7-chloronorbornene, 2-methylnorbornene, γ-fenchene, bornylene, 5-chloromethylnorbornene, endocamphene, α-pinene and myrcenyl chloride;

the acetylenic compounds of (4) are selected from the group consisting of acetylene, methylacetylene, ethylacetylene, 1-hexine, phenylacetylene, cyclohexylacetylene, vinylacetylene, divinylacetylene, hexene-1-in-4, butenylmethylacetylene, allylethylacetylene, allylcyclohexylacetylene and allyl-(p-chloropheny) acetylene;

the polyenic compounds of (3) are selected from the group consisting of 1,3-butadiene, isoprene, 1,3-pentadiene, 1,4-pentadiene, 1,4-hexadiene, 1,5-hexadiene, 2,3-dimethyl-1,3-butadiene, 11-ethyl-1,11-tridecadiene, myrcene, 1,3,5-hexatriene, 2-chloro-1,3-butadiene, 3-fluoro-1,4-hexadiene, p-divinylbenzene, p-isopropenylstyrene, diallylcyclohexane, trivinylcyclohexane, 4-vinylcyclohexane-1, 2-methylallylcyclopentene-1, 3-allylindene, 4,7,8,9-tetrahydroindene, bicyclo-(2,4,0)-octadiene-2,7, fulvene, 1,3-cyclopentadiene, 5-chloro-1,3-pentadiene, 1,5-cyclooctadiene, 1,3,5-cycloheptatriene, Δ2,2-dicyclopentenyl, dicyclopentadiene, 2,5-norbornadiene, 5-methylene-2-norbornene, 5-vinyl - 2 - norbornene, 5-isopropenyl-2-norbornene, 2 - vinyl - 1,4 - endomethylene-1,2,3,4,5,5a,8,8a-octahydronaphthalene, limonene and dipentene;

the carbonyl- or thiocarbonyl-containing compounds of (5) are selected from the group consisting of vinyl formate, vinyl acetate, vinyl propionate, vinyl pelargonate, vinyl - 2 - ethyl-hexanecarboxylate, vinyl stearate, ethylvinyl oxalate, vinyl chloroacetate, vinyl thiolacetate, vinyl benzoate, vinyl cyclohexanecarboxylate, vinylnorbornene-2-carboxylate, allyl acetate, allyl laurate, allyl-cyclobutanecarboxylate, 2-chloroallyl acetate, isopropenyl acetate, α-methylallyl acetate, 1-propenyl acetate, 1-isobutenyl butyrate, methylvinyl carbonate, S-ethyl-O-vinyl thiolcarbonate, O-cyclohexyl-O-vinyl thioncarbonate, phenylvinyl trithiocarbonate, O - vinyl - N,N - dimethylcarbamate, S - vinyl-N,N-diethylthiolcarbamate, O-allyl-N,N-dimethylthioncarbamate, S-isopropenyl-N,N-diethyldithiocarbamate, N-vinylacetamide, N-allyl-N-methylpropionic acid amide, N-vinylbenzoic acid amide, N - vinylthioacetamide, N-vinylurethane-(N-vinyl-O-ethylcarbamate), N-ethyl-N-vinyl-methylcarbamate, N-vinyl - S - phenyl-thiolcarbamate, N-vinyl-O-ethylthioncarbamate, N-vinyl - N - ethyl-S-ethyldithiocarbamate, N-ethyl-N-vinylurea, N,N-diethyl-N-vinyl-N - ethylurea, N - phenyl-N-vinylthiourea, N-vinylcarbamyl chloride, N-vinyl-N-ethyl-thiocarbamyl chloride, N-vinylpyrrolidone, N-vinylpiperidone, N-vinylcaprolactam, N-vinylsuccinic acid imide, N-vinylphthalimide, N-isopropenylphthalimide, N-vinyloxazolidinone, N - allyl-5-methyloxazolidinone, N-vinyldiglycolimide, N-vinylethyleneurea, N-ethyl-N-vinylpropyleneurea and N-vinylethylenethiourea; and the conjugated compounds of group (B) are selected from the group consisting of methyl acrylate, ethyl acrylate, n-butyl acrylate, t-butyl acrylate, n-amyl acrylate, 2-ethylhexyl acrylate, octadecyl acrylate, allyl acrylate, 1-propenyl acrylate, isopropenyl acrylate, isobutenyl acrylate, methallylacrylate, phenyl acrylate, o-tolyl acrylate, benzyl acrylate, cyclohexyl acrylate, β-terpinenyl acrylate, citronellyl acrylate, n-butenyl-1 acrylate, 2-chloroethyl acrylate, β-chloroallyl acrylate, geranyl acrylate, crotyl acrylate, cinamyl acrylate, p-isobutenylphenyl acrylate, cyclohexenyl acrylate, cyclopentenyl acrylate, norbornenylmethyl acrylate, indenyl acrylate, methyl thiolacrylate, ethyl thiolacrylate, acrylamide, N-methyl-acrylamide, N-n-butyl acrylamide, N-2'-ethylhexyl acrylamide, N-octyl acrylamide, N-lauryl acrylamide, N-stearyl acrylamide, N-cyclohexyl acrylamide, N - tolyl acrylamide, N,N - dimethyl acrylamide, N-methyl-N-ethyl acrylamide, N,N-di-n-butyl acrylamide, acrylyl morpholine, acrylyl pyrrolidine, acryloyl chloride, acryloyl bromide, acrylic acid, thioacrylic acid, sodium acrylate, potassium acrylate, zinc acrylate, aluminum acrylate, ammonium acrylate, acrolein, methylvinyl ketone, ethylvinyl ketone, phenylvinyl ketone, methyl methacrylate, ethyl methacrylate, butyl methacrylate, octadecyl methacrylate, benzyl methacrylate, phenyl methacrylate, tolyl methacrylate, cyclohexyl methacrylate, allyl methacrylate, crotyl methacrylate, 2-chloroethyl methacrylate, methyl thiolmethacrylate, ethyl thiomethacrylate, methyl α-ethylacrylate, ethyl α-butylacrylate, methyl α-cyclohexylacrylate, methyl α-phenylacrylate, methyl α-chloroacrylate, methyl α-bromoacrylate, methyl α-(p-chlorophenyl)acrylate, methylacrylamide, N-ethyl methacrylamide, N-cyclohexyl methacrylamide, N,N - dimethyl methacrylamide, methacrylyl piperidine, α-ethylacrylamide, α-chloroacrylamide, α-chloromethyl acrylamide, methacryloyl chloride, α-chloroacryloyl chloride, α-ethylmethacryloyl chloride, methacrylic acid, thiolmethacrylic acid, sodium methacrylate, zinc methacrylate, aluminum methacrylate, ammonium α-fluoroacrylate, methacrolein, methylisopropenyl ketone, 1-chlorobutenylethyl ketone, methacrylonitrile, α-ethylacrylonitrile, α-cyclohexylacrylonitrile, α-chloroacrylonitrile, α-chloromethylacrylonitrile, ethyl crotonate, phenyl crotonate, crotonamide, crotyloyl chloride, crotonitrile, methyl cinnamate, butyl cinnamate, chloromethyl cinnamate, cinnamic nitrile, methyl β-ethyl-acrylate and methyl β-chloromethyl acrylate.

20. A process for producing an interpolymer of three to ten monomers from groups (A) and (B) as defined in claim 1, wherein at least one monomer is selected from said group (A) and at least one monomer is selected from said group (B), which comprises contacting and polymerizing said monomers with at least one catalyst selected from the group consisting of (1) at least one organometal halide having the formula:

$$MR'''_nX_{3-n}$$

wherein M is aluminum or boron; R''' is a hydrocarbon radical having 1 to 20 carbon atoms; X is a halogen atom; and $3>n>0$, or a mixture of at least two compounds having the formulas:

(a) $MR'''_nX_{3-n}$, (b) $M'R''''_3$ and (c) $M''X'_3$ wherein M, M' and M'' are aluminum or boron; R''' and R'''' each is a hydrocarbon radical having 1 to 20 carbon atoms; X and X' each is a halogen atom; and $3>n>0$, and (2) at least one complex obtained by contacting in the presence of at least one group (B) monomer, (a') at least one organic compound of metal of Groups IIb, IIIb and IVb of Mendeleev's Periodic Table with (b') at least one halide of metal of Groups IIIb and IVb of said Table, at least one of (a') and (b') being a compound of boron or aluminum, at a temperature between —150° C. and about +100° C. the said catalyst being used in an amount of from about 0.0005 to about 10 moles per mole of said group (B) monomer, and said interpolymer consisting essentially of an alternating interpolymer having a structure such that monomer units from group (A) alternate with monomer units from group (B), each monomer unit being linked only to monomer units from the other group.

21. A process according to claim 20, wherein the halogen-containing metal compound is used in an amount substantially equimolar to the amount of the group (B) monomer.

22. A process according to claim 20, wherein the copolymerization is effected in the presence of oxygen or at least one organic peroxide.

23. A process according to claim 20, wherein the copolymerization is effected in the presence of 0.001 to 20 mole percent of oxygen or an organic peroxide based on the amount of the group (B) monomer.

24. A process according to claim 20, wherein the copolymerization is effected in a liquid monomer, a hydrocarbon medium or a halogenated hydrocarbon medium.

25. A process for producing an interpolymer of three to ten monomers from groups (A) and (B) as defined in claim 1, wherein at least one monomer is selected from said group (A) and at least one monomer is selected from said group (B), which comprises contacting and polymerizing said monomers with: (a) at least one organic compound having the formula:

$$M'''R^v_nX''_{p-n}$$

wherein R''' is a metal of Group IIb, IIIb or IVb of Mendeleev's Periodic Table; R^v is a hydrocarbon group having 1 to 20 carbon atoms; X'' is a halogen atom; p is the valency of the metal; and $p≧n≧1$, and (b) at least one halogenocompound having the formula:

$$M''''X'''_mR^{vi}_{q-m}$$

wherein M'''' is a metal of Group IIIb or IVb of Mendeleev's Periodic Table; X''' is a halogen atom, R^vi is a hydrocarbon radical having 1 to 20 carbon atoms; q is the valency of the metal; and $q≧m≧1$, provided that the metal of at least one of the (a) and (b) components is aluminum or boron and provided that the (a) component is contacted with the (b) component in the presence of at least the group (B) monomer, at a temperature between —150° C. and about +100° C., the said catalyst being used in an amount of from 0.005 to about 10 moles per mole of said group (B) monomer, and said interpolymer consisting essentially of an alternating interpolymer having a structure such that monomer units from group (A) alternate with monomer units from group (B), each monomer unit being linked only to monomer units from the other group.

26. A process for producing an interpolymer of three to ten monomers from groups (A) and (B) as defined in claim 1, wherein at least one monomer is selected from said group (A) and at least one monomer is selected from said group (B), which comprises contacting and polymerizing said monomers with a catalyst selected from the group consisting of (1) an organometal halide having the formula:

$$MR'''_nX_{3-n}$$

wherein M is aluminum or boron; R''' is a hydrocarbon radical having 1 to 20 carbon atoms; X is a halogen atom; and $3>n>0$, or a mixture of at least two compounds having the formulas:

(a) $MR'''_nX_{3-n}$, (b) $M'R''''_3$ and (c) $M''X'_3$ wherein M, M' and M'' are aluminum or boron; R''' and R'''' each is a hydrocarbon radical having 1 to 20 carbon atoms; X and X' each is a halogen atom; and $3>n>0$, and (2) a complex obtained by contacting in the presence of at least one group (B) monomer (a') an organic compound of metal of Groups IIb, IIIb and IVb of Mendeleev's Periodic Table with (b') a halide of metal of Group IIIb or IVb of said table, at least one of (a') and (b') being a compound of boron or aluminum, at a temperature between —150° C. and about +100° C., the said catalyst being used in an amount of from about 0.0005 to about 10 moles per mole of said group (B) monomer, and said interpolymer consisting essentially of an alternating interpolymer having a structure such that monomer units from group (A) alternate with monomer units from group (B), each monomer unit being linked only to monomer units from the other group.

27. A process according to claim 20, wherein the catalyst is used in the form of a mixture of (1) and (1), of (2) and (2) or of (1) and (2).

28. A process for producing an interpolymer of three to ten monomers from groups (A) and (B) as defined in claim 1, wherein at least one monomer is selected from said group (A) and at least one monomer is selected from said group (B), which comprises contacting and polymerizing said monomers with a catalyst which is a mixture of two organometal halides having the formula:

$$MR'''_nX_{3-n}$$

wherein M is aluminum or boron; R''' is a hydrocarbon radical having 1 to 20 carbon atoms; X is a halogen atom; and $3>n>0$, or a mixture of two or more compounds having the formulas:

(a) $MR'''_nX_{3-n}$, (b) $M'R''''_3$ and (c) $M''X'_3$ wherein M, M' and M'' are aluminum or boron; R''' and R'''' each is a hydrocarbon radical having 1 to 20 carbon atoms; X and X' each is a halogen atom; and $3>n>0$, at a temperature between —150° C. and about +100° C., the said catalyst being used in an amount of from about 0.0005 to about 10 moles per mole of said group (B) monomer, and said interpolymer consisting essentially of an alternating interpolymer having a structure such that monomer units from group (A) alternate with monomer units from group (B), each monomer unit being linked only to monomer units from the other group.

References Cited

UNITED STATES PATENTS

| | | | |
|---|---|---|---|
| 2,478,627 | 8/1949 | Ham | 260—80.5 |
| 3,054,782 | 9/1962 | Saxon | 260—80.5 |
| 3,061,562 | 10/1962 | Grenley et al. | 260—17.4 |
| 3,159,607 | 12/1964 | D'Alelio | 260—82.1 |
| 3,215,657 | 11/1965 | Beresniewicz et al. | 260—28.5 |
| 3,238,186 | 3/1966 | Schultz et al. | 260—88.7 |
| 3,317,496 | 5/1967 | Natta et al. | 260—88.2 |
| 3,326,870 | 6/1967 | Nakaguchi et al. | 260—85.5 |
| 3,380,974 | 4/1968 | Stilmar | 260—80.8 |
| 3,700,647 | 10/1972 | Nakaguchi et al. | 260—63 R |
| 3,700,648 | 10/1972 | Hirooka et al. | 260—63 R |

STANFORD M. LEVIN, Primary Examiner

U.S. Cl. X.R.

260—73 C, 77.5 BB, 77.5 UA, 79.7, 80.6, 80.71, 80.72, 80.73, 80.77, 80.78, 80.8, 80.81